United States Patent [19]

Uno et al.

[11] Patent Number: 5,418,291

[45] Date of Patent: May 23, 1995

[54] THERMOPLASTIC RESIN COMPOSITIONS COMPRISING PPE, POLYSTYRENE, AN ETHYLENE CO-OLIGOMER, DIBLOCK COPOLYMERS AND TRIBLOCK COPOLYMERS

[75] Inventors: Hideo Uno, Tokyo; Hiroshi Murayama, Hiratsuka; Yasumasa Norisue, Hiratsuka; Ryu Iwasaki, Hiratsuka, all of Japan

[73] Assignee: Mitsubishi Gas Chemical Company, Inc., Tokyo, Japan

[21] Appl. No.: 182,636

[22] Filed: Jan. 18, 1994

Related U.S. Application Data

[63] Continuation of Ser. No. 982,406, Nov. 27, 1992, abandoned, which is a continuation-in-part of Ser. No. 736,053, Jul. 26, 1991, abandoned.

[30] Foreign Application Priority Data

Jul. 30, 1990 [JP] Japan .................. 2-199208
May 22, 1991 [JP] Japan .................. 3-146880

[51] Int. Cl.$^6$ .................. C08L 23/08; C08L 25/04; C08L 71/12
[52] U.S. Cl. .................. 525/89; 525/92 A; 525/133; 525/152; 525/905
[58] Field of Search .................. 525/92, 89, 133, 152, 525/905

[56] References Cited

U.S. PATENT DOCUMENTS

| | | | |
|---|---|---|---|
| 4,166,055 | 8/1979 | Lee, Jr. .................. | 525/92 |
| 4,239,673 | 12/1980 | Lee, Jr. .................. | 525/93 |
| 4,277,575 | 7/1981 | Haaf et al. .................. | 525/89 |
| 4,282,335 | 8/1981 | Sugio et al. .................. | 525/68 |
| 4,373,045 | 2/1983 | Cooper et al. .................. | 525/68 |
| 4,383,082 | 5/1983 | Lee, Jr. .................. | 525/92 |
| 4,446,272 | 5/1984 | Fukuda et al. .................. | 525/68 |
| 5,166,264 | 11/1992 | Lee, Jr. et al. .................. | 525/92 |

FOREIGN PATENT DOCUMENTS

| | | | |
|---|---|---|---|
| 0095098 | 5/1983 | European Pat. Off. . | |
| 0115712 | 8/1984 | European Pat. Off. .................. | 525/92 |
| 0263678 | 10/1987 | European Pat. Off. . | |
| 0274029 | 11/1987 | European Pat. Off. . | |
| 0362660 | 9/1989 | European Pat. Off. . | |

*Primary Examiner*—Thomas Hamilton, III
*Attorney, Agent, or Firm*—Wenderoth, Lind & Ponack

[57] ABSTRACT

A resin composition comprising
 (a) a polyphenylene ether resin or a mixture of it and a polystyrene resin,
 (b) a co-oligomer of ethylene and an alpha-olefin,
 (c) optionally an elastomeric hydrogenated A-B-A block copolymer, and
 (d) optionally an elastomeric hydrogenated A-B block copolymer.

The chemical resistance of the polyphenylene ether is improved.

7 Claims, No Drawings

THERMOPLASTIC RESIN COMPOSITIONS COMPRISING PPE, POLYSTYRENE, AN ETHYLENE CO-OLIGOMER, DIBLOCK COPOLYMERS AND TRIBLOCK COPOLYMERS

This application is a continuation of now abandoned application Ser. No. 07/982,406 filed Nov. 27, 1992, which was a continuation-in-part of now abandoned application Ser. No. 07/736,053, filed Jul. 26, 1991.

FIELD OF INDUSTRIAL UTILIZATION

This invention relates to a novel resin composition having improved chemical resistance of a polyphenylene ether resin. More specifically, this invention provides a resin composition suitable for use in the fields of automobiles, office appliances, and the like.

PRIOR ART AND ITS PROBLEMS

Polyphenylene ether resins are known resins and are high-performance engineering plastics having relatively high melt viscosity and high softening point. Since the polyphenylene ethers per se are, however, poor in chemical resistance, especially in organic solvent resistance, their use is limited. Moreover, because of high melt viscosity, it is hard to mold the polyphenylene ether resins alone, and impact resistance of molded articles is also poor.

In order to solve such problems, a resin composition of a polyphenylene ether resin and a rubber-modified styrene resin is disclosed in U.S. Pat. No. 3,383,435. Although this resin composition improves moldability and impact resistance of the polyphenylene ether resin, improvement in chemical resistance is insufficient.

Japanese Laid-open Patent Application No. 99,162/1985 involves a resin composition comprising (a) a polyphenylene ether resin alone or a resin mixture of it and a polystyrene polymer and (b) at least one of liquid polybutene and liquid polybutadiene. This resin composition aims to improve solvent cracking resistance and impact resistance of the polyphenylene ether resin. Nevertheless, this resin composition is not said to improve satisfactorily enough in solvent resistance.

PROBLEMS THIS INVENTION AIMS TO SOLVE

Since durability in wax removers, gasoline, kerosine, etc. is required of polyphenylene ether resins when using same particularly in automobile exterior parts, the usage of conventional polyphenylene ether resins has been limited.

The present inventors have made assiduous investigations to further improve chemical resistance and solvent resistance of a polyphenylene ether resin alone or a resin composition of it and a styrene resin, and has consequently found that the aforesaid problems are solved by blending a co-oligomer of ethylene and an alpha-olefin and further an elastomeric hydrogenated A-B-A block copolymer, or said copolymer and an elastomeric hydrogenated A-B block copolymer. This finding has led to completion of this invention.

MEANS FOR SOLVING PROBLEMS

This invention is thus to provide a thermoplastic resin composition composed substantially of (a) a polyphenylene ether resin alone containing as a main chain a recurring structural unit represented by the formula

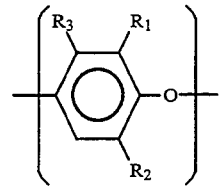

wherein $R_1$ denotes a lower alkyl group having 1 to 3 carbon atoms, and $R_2$ and $R_3$, independently, each denote a hydrogen atom or a lower alkyl group having 1 to 3 carbon atoms, or a mixture of it and a polystyrene resin, (b) a co-oligomer of ethylene and an alpha-olefin containing a recurring unit represented by the formula

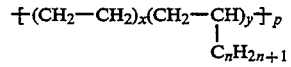

wherein x is an integer of 1 to 30, y is an integer of 1 to 10, p is an integer of 3 to 60, and y is an integer of 1 to 14, and having a number average molecular weight of 500 to 5,000, (c) an elastomeric hydrogenated A-B-A block copolymer wherein A is a vinyl aromatic hydrocarbon polymer block and B is a polymer block of a saturated hydrocarbon compound, and (d) an elastomeric hydrogenated A-B block copolymer wherein A is a vinyl aromatic hydrocarbon polymer block and B is a polymer block of a saturated hydrocarbon compound, components (a), (b), (c) and (d) of said composition being contained such that (i) per 100 parts by weight of component (a), component (b) is 0.1 to 15 parts by weight, component (c) is 0 to 30 parts by weight, and component (d) is 0 to 30 parts by weight, and (ii) when component (d) is not less than 1 part by weight per 100 parts by weight of component (a), a component (c): component (d) weight ratio is 8:2 to 2:8.

The resin composition of this invention is described in more detail below.

In the resin composition of this invention, a polyphenylene ether resin (PPE) or a mixture of it and a polystyrene resin is used as component (a).

The polyphenylene ether resin is a polymer containing as a main chain a recurring structural unit represented by the formula

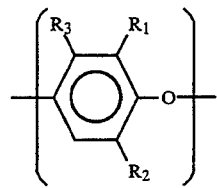

wherein

R₁ denotes a lower alkyl group having 1 to 3 carbon atoms, and

R₂ and R₃, independently, each denote a hydrogen atom or a lower alkyl group having 1 to 3 carbon atoms, and said polymer may be either a homopolymer or a copolymer. Commercially available polyphenylene ether resins can be ordinarily used.

Concrete examples of the polyphenylene ether resin include poly(2,6-dimethyl-1,4-phenylene) ether, poly(2,6-dimethyl-1,4-phenylene) ether, poly(2,6-dipropyl-1,4-phenylene) ether, poly(2-methyl-6-ethyl-1,2phenylene) ether, and poly(2-methyl-6-propyl-1,4-phenylene) ether. Poly(2,6-dimethyl-1,4-phenylene) ether or a 2,6-dimethylphenol/2,3,6-trimethylphenol copolymer is especially preferable.

It is suitable that the polyphenylene ether resin has an intrinsic viscosity, as measured at 25° C. in chloroform, of 0.2 to 0.7 dl/g, preferably 0.3 to 0.55 dl/g.

The polystyrene resin used in combination with the polyphenylene ether resin is a resin containing at least 25% by weight, preferably at least 50% by weight of a recurring structural unit represented by the formula

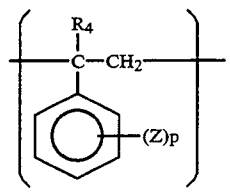

wherein

R₄ denotes a hydrogen atom or a lower alkyl group,
Z denotes a halogen atom or a lower alkyl group, and
p is 0 or an integer of 1 to 3.

Examples of the polystyrene resin include polystyrene, a high-impact polystyrene, a styrene-butadiene copolymer, a styrene-butadiene-acrylonitrile copolymer, a styrene-acrylonitrile copolymer, a styrene-alphamethylstyrene copolymer, a styrene-maleic anhydride copolymer, a styrene-methyl methacrylate copolymer, an ethylene-styrene copolymer, and an ethylene-propylene-butadiene-styrene copolymer.

Examples of the high-impact polystyrene include polybutadiene, a butadiene-styrene copolymer rubber, and a polystyrene modified with a rubber component such as EPDM. This rubber-modified polystyrene usually contains not more than 20% by weight of the rubber component.

It is suitable that the polystyrene resin used as component (a) in the resin composition of this invention has a number average molecular weight, as measured by GPC, of 3,000 to 500,000, preferably 3,000 to 200,000.

A mixing ratio of the polyphenylene ether resin and the polystyrene resin as component (a) is that the polyphenylene ether resin is 10 to 100% by weight, preferably 20 to 80% by weight, and the polystyrene resin is 0 to 90% by weight, preferably 20 to 80% by weight.

The ethylene-alpha-olefin co-oligomer used as component (b) in the resin composition of this invention is a co-oligomer of ethylene and an alpha-olefin containing a recurring structural unit represented by the formula

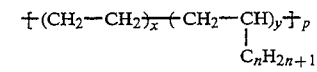

wherein x is an integer of 1 to 30,
y is an integer of 1 to 10,
p is an integer of 3 to 10, and
n is an integer of 1 to 14, and having a number average molecular weight of 500 to 5,000, preferably 1,000 to 3,000. Examples of the alpha-olefin include propylene, n-butene-1, n-hexene-1 and n-octene-1. When the number average molecular weight of the co-oligomer as component (b) is lower than 500, undesirous cloudiness or silver streaks are observed in the appearance of an article obtained by injection molding.

On the other hand, when the number average molecular weight of the co-oligomer exceeds 5,000, a delamination phenomenon is undesirously liable to occur in the appearance of the molded article.

By the way, the ethylene-alpha-olefin co-oligomer is commercially available under the tradename "Lucant" (Mitsui Petrochemical Industries, Ltd.), and can be obtained with ease.

A mixing ratio of the ethylene-alpha-olefin co-oligomer as component (b) is 0.1 to 15 parts by weight, preferably 0.5 to 10 parts by weight per 100 parts by weight of component (a). When the ratio of component (b) is less than 0.1 part by weight, effects of improvements in chemical resistance and solvent resistance are not sufficient. When said ratio exceeds 15 parts by weight, a delamination phenomenon occurs in the surface of the molded article or heat resistance decreases. Thus, it is improper.

The elastomeric hydrogenated block copolymer used as component (c) in the resin composition of this invention has an A-B-A structure wherein A and B are polymer blocks. The central block B is composed of a saturated hydrocarbon compound. Before the hydrogenation, the block is a polybutadiene or polyisoprene block, and the double bond of the polybutadiene or polyisoprene block is converted into a saturated hydrocarbon by the hydrogenation.

Meanwhile, the terminal block A of component (c) is a a vinyl aromatic hydrocarbon polymer block, preferably a polystyrene block. The number average molecular weight of the terminal block A is usually 4,000 to 115,000, preferably 5,000 to 40,000. The number average molecular weight of the central block B is usually 20,000 to 450,000, preferably 25,000 to 150,000. The elastomeric hydrogenated block copolymer (component c) can easily be obtained on the market, and is commercially available from, e.g., Shell Chemical under the tradenames "Kraton G1650", "Kraton G1651", "Kraton G1652", etc.

A mixing ratio of the elastomeric hydrogenated A-B-A block copolymer as component (c) is 1 to 30 parts by weight, most preferably 5 to 20 parts by weight per 100 parts by weight of component (a). Component (c) improves chemical resistance and impact resistance. When the ratio of component (c) exceeds 30 parts by weight, rigidity decreases.

The elastomeric hydrogenated block copolymer used as component (d) in the resin composition of this invention has an A-B structure wherein A and B are polymer blocks.

The block A of component (d) is a vinyl aromatic hydrocarbon polymer block, preferably a block composed of polystyrene. The number average molecular weight of the block A is usually 4,000 to 120,000, preferably 5,000 to 40,000. The block B is composed of a saturated hydrocarbon compound. Before the hydrogenation, the block B is a polybutadiene or polyisoprene block. By the hydrogenation, the double bond of the polybutadiene or the polyisoprene is converted into a saturated hydrocarbon. The number average molecular weight of the block B is usually 4,000 to 500,000, Preferably 25,000 to 150,000. The elastomeric hydrogenated block copolymer [component (d)] can easily be obtained on the market, and is commercially available by Shell Chemical under the tradenames "Kraton G1702" and "Kraton G1701".

A mixing ratio of the elastomeric hydrogenated A-B block copolymer as component (d) is 1 to 30 parts by weight, most preferably 5 to 20 parts by weight per 100 parts by weight of component (a). From the aspects of oil resistance and appearance of a molded article, it is advisable that when at least 1 part by weight of component (d) per 100 parts by weight of component (a) is used, a component (c): component (d) weight ratio is 8:2 to 2:8.

In components (c) and (d) of this invention, a degree of hydrogenation may be such that the double bonds contained in the blocks B in said components (c) and (d) before the hydrogenation are substantially saturated.

A method for producing the resin composition of this invention is not limited in particular, and the individual components may properly be compounded in a usual manner. Moreover, the resin composition of this invention may contain, as required, various additives such as a pigment, a heat stabilizer, an ultraviolet absorber, a fire retardant, and a filler.

A mixture of them is kneaded and extruded in an extruder, and pelletized to a suitable size.

EXAMPLES

The following Examples and Comparative Examples illustrate this invention specifically. This invention is however never limited thereto.

EXAMPLES 1 to 3 and COMPARATIVE EXAMPLES 1 to 2

A poly(2,6-dimethyl-1,4-phenylene) ether powder having an intrinsic viscosity of 0.50 dl/g as measured at 25° C. in chloroform, a high-impact polystyrene ("Diarex YH-478": a tradename for a product of Mitsubishi Kasei Polytec Company), an ethylene-alpha-olefin co-oligomer ("Lucant HC-100": a tradename for a product of Mitsui Petrochemical Industries, Ltd.), and an elastomeric hydrogenated A-B-A block copolymer ("Kraton G1650": a tradename for a product of Shell Chemical) were compounded according to a formulation shown in Table 1, mixed by a Henschel mixer, and melt-kneaded at 250° to 270° C. and extruded by a biaxial extruder (PCM-30: a tradename for a machine of Ikegai Iron Works, Ltd.) to obtain pellets. The pellets were injection-molded into various test pieces. Using the test pieces, various properties were measured, and the results are shown in Table 1.

Incidentally, an example of not containing the ethylene-alpha-olefin co-oligomer as component (b) and an example of using the ethylene-alpha-olefin co-oligomer as component (b) in a larger amount than that in this invention are shown in Comparative Examples 1 and 2, respectively.

EVALUATION OF CHEMICAL RESISTANCE

A 1.0% bending strain was exerted to the test piece. A filter paper was attached to a portion having the maximum strain stress by a cellophane adhesive tape, and a kerosine-type wax remover (or a salad oil, or Launa oil) was then coated on the portion of the filter paper. The resulting test piece was then left to stand at room temperature for 48 hours. Subsequently, a tensile test was run and the chemical resistance was evaluated by percent retention of elongation at break. It was found that the higher the percent retention, the better the chemical resistance.

Evaluation of the chemical resistance:
- ⊙ : percent retention - more than 70%
- ○ : percent retention - 40–70%
- X : percent retention - less than 40%

TABLE 1

|  | Ex. 1 | CEx. 1 | Ex. 2 | Ex. 3 | CEx. 2 |
|---|---|---|---|---|---|
| Formulation (parts by weight) |  |  |  |  |  |
| component (a): |  |  |  |  |  |
| polyphenylene ether | 38 | 34 | 32 | 32 | 30 |
| Diarex YH-478 | 60 | 60 | 60 | 57 | 44 |
| component (c): Kraton G1650 | 0 | 6 | 6 | 6 | 6 |
| component (d): Lucant HC-100 | 2 | 0 | 2 | 5 | 20 |
| Appearance of a molded article (*) | ○ | ○ | ○ | ○ | X |
| Tensile strength (Kg/cm$^2$) | 620 | 550 | 500 | 450 | 350 |
| Flexural strength (Kg/cm$^2$) | 810 | 780 | 650 | 600 | 500 |
| Flexural modulus (Kg/cm$^2$) | 23500 | 22500 | 22500 | 21000 | 18000 |
| Izod impact strength (1/8" thick) (Kg · cm/cm) | 8 | 18 | 15 | 25 | 30 |
| Heat distortion temperature (18.6 kg/cm$^2$) | 118 | 115 | 115 | 115 | 110 |
| Chemical resistance | ○ | X | ⊙ | ⊙ | ⊙ |

Ex: Example
CEx: Comparative Example
(*) Evaluated by delamination of a molded article 125 mm in length, 12.5 mm in width and 1.6 mm in thickness.
○: Delamination was not observed.
X: Delamination was observed.

EXAMPLES 4 to 5 and COMPARATIVE EXAMPLES 3 to 4

The same components as in Example 1 were compounded according to a formulation shown in Table 2 except that a fire retardant was added for imparting fire retardance. Tensile test pieces were prepared as in Example 1. Using the test pieces, the test for chemical resistance to a salad oil and a Launa oil was conducted as in Example 1. The results are shown in Table 2.

For comparison, examples of not containing the ethylene-alpha-olefin co-oligomer are shown in Comparative Examples 3 and 4.

TABLE 2

|  | Ex. 4 | CEx. 3 | Ex. 5 | CEx. 4 |
|---|---|---|---|---|
| Formulation (parts by weight) | | | | |
| component (a): | | | | |
| polyphenylene ether | 33 | 34 | 53 | 54 |
| Diarex YH-478 | 42 | 43 | 36 | 37 |
| component (c): Kraton G1650 | 8 | 8 | 4 | 4 |
| Component (b): Lucant HC-100 | 2 | 0 | 2 | 0 |
| brominated styrene | 10 | 10 | — | — |
| antimony trioxide | 5 | 5 | — | — |
| triphenyl phosphate | — | — | 5 | 5 |
| Appearance of a molded article | ◯ | ◯ | ◯ | ◯ |
| Fire retardance (UL 94 1.6 mm) | V-0 | V-0 | V-1 | V-1 |
| Chemical resistance | | | | |
| Nisshin Salad Oil[1] | ◉ | X | ◯ | X |
| Launa 40[2] | ◉ | X | ◉ | X |

[1] Tradename for a product of The Nisshin Oil Mills, Ltd.
[2] Tradename for a product of Nippon Oil Co., Ltd.

EXAMPLES 6 to 8 and COMPARATIVE EXAMPLES 1 to 3

(1) Production of resin composition pellets

A poly(2,6-dimethyl-1,4-phenylene) ether powder having an intrinsic viscosity of 0.50 dl/g as measured at 25° C. in chloroform, a high-impact polystyrene ("Diarex YH-478": a tradename for a product of Mitsubishi Kasei Polytec Company), polystyrene ("Diarex HF-77": a tradename for a product of Mitsubishi Kasei Polytec Company), an ethylene-alpha-olefin co-oligomer ("Lucant HC150": a tradename for a product of Mitsui Petrochemical Industries, Ltd.), an elastomeric hydrogenated A-B-A block copolymer ("Kraton G1650": a tradename for a product of Shell Chemical), an elastomeric hydrogenated A-B block copolymer ("Kraton G1702": a tradename for a product of Shell Chemical), and brominated polystyrene and antimony trioxide as a fire retardant were compounded according to a formulation shown in Table 3, mixed with a Henschel mixer, and melt-kneaded at 250° to 270° C. and extruded by a biaxial extruder (PCM-30: a tradename for a machine of Ikegai Iron Works, Ltd.) to obtain pellets. The pellets were molded into test pieces for evaluation of chemical resistance, etc.

(2) Evaluation of chemical resistance, etc.

A 1.0% bending strain was exerted to the test piece (having the size described in ASTM, D638). A filter paper was attached to a portion having the maximum strain stress by a cellophane adhesive tape, and a salad oil ("Nisshin Salad Oil": a tradename for a product of The Nisshin Oil Mills, Ltd.) was then coated on the portion of the filter paper. After the resulting test piece was left to stand at room temperature for 48 hours, the tensile test was run, and the chemical resistance was evaluated by percent retention of elongation at break. It was found that the higher the percent retention, the better the chemical resistance.

The appearance of the molded article was evaluated by delamination of the molded article (having a length of 125 mm, a width of 12.5 mm and a thickness of 1.6 mm).

For comparison, an example of not containing polystyrene, the ethylene-alpha-olefin co-oligomer and the elastomeric hydrogenated A-B block copolymer was shown in Comparative Example 5. Further, Comparative Example 6 shows an example which does not contain the elastomeric hydrogenated A-B block copolymer of component (d). Comparative Example 7 shows an example in which only component (d) of the critical components (a)-(d) has been omitted. The properties were measured, and the results are shown in Table 3.

The appearance of the molded article and the chemical resistance in Table 3 are evaluated as follows.

Appearance of the molded article:
◉ : Surface delamination was not observed.
X : Surface delamination was observed.

Chemical resistance:
◉ : Percent retention of elongation at break - more than 70%
◯ : Percent retention of elongation at break - 40-70%
X : Percent retention of elongation at break - less than 40%
* : Surface delamination was observed.

TABLE 3

|  | Ex. 6 | Ex. 7 | Ex. 8 | CEx. 5 | CEx. 6 | CEx. 7 |
|---|---|---|---|---|---|---|
| Formulation (parts by weight) | | | | | | |
| Polyphenyl ether [(component (a)] | 40 | 40 | 50 | 40 | 40 | 40 |
| Diarex YH-478 [(component (a)] | 50 | 50 | 28 | 50 | 50 | 28 |
| Diarex HF-77 [(component (a)] | 0 | 0 | 12 | 0 | 0 | 12 |
| Kraton G1650 [(component (c)] | 5 | 5 | 5 | 10 | 10 | 10 |
| Kraton G1702 [(component (d)] | 5 | 5 | 5 | 0 | 0 | 0 |
| Lucant HC150 [(component (b)] | 2 | 4 | 4 | 0 | 4 | 4 |
| brominated polystyrene | 12 | 12 | 0 | 12 | 12 | 0 |
| antimony trioxide | 6 | 6 | 0 | 6 | 6 | 0 |
| Appearance of a molded article | ◉ | ◉ | ◉ | ◉ | * | * |
| Fire retardance (1.6 mm) | V-0 | V-0 | HB | V-0 | V-0 | HB |
| Chemical resistance | | | | | | |
| Nisshin Salad Oil | | | | | | |
| (room temperature) | ◉ | ◉ | ◉ | X | ◯ | ◯ |
| (85° C.) | ◯ | ◉ | ◯ | X | △ | △ |

EFFECTS OF THE INVENTION

The resin composition of this invention maintains the mechanical strength and the heat resistance of the ordinary polyphenylene ether resin and is significantly improved in chemical resistance and oil resistance. Accordingly, said resin composition is well suited for use in automobile exterior parts, parts of office appliances, and the like.

What we claim is:

1. A thermoplastic resin composition consisting essentially of:
   (a) a mixture of (1) polyphenylene ether resin containing as a main chain a recurring structural unit represented by the formula

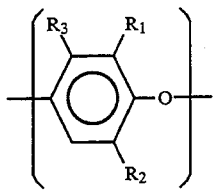

wherein $R_1$ denotes a lower alkyl group having 1 to 3 carbon atoms, and $R_2$ and $R_3$, independently, each denote a hydrogen atom or a lower alkyl group having 1 to 3 carbon atoms, and (2) polystyrene resin, said mixture comprising 20 to 80% by weight of a polyphenylene ether resin and 80 to 20% by weight of a polystyrene resin, (b) a co-oligomer of ethylene and an alpha-olefin containing a recurring unit represented by formula

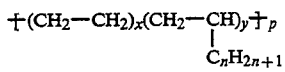

wherein
x is an integer of 1 to 30,
y is an integer of 1 to 10,
p is an integer of 3 to 60, and
n is an integer of 1 to 14,
and having a number average molecular weight of 500 to 5,000, (c) an elastomeric hydrogenated A-B-A block copolymer wherein A is a vinyl aromatic hydrocarbon polymer block and B is a polymer block of a saturated hydrocarbon compound, and (d) an elastomeric hydrogenated A-B block copolymer wherein A is a vinyl aromatic hydrocarbon polymer block and B is a polymer block of a saturated hydrocarbon compound, components (a), (b), (c) and (d) of said composition being contained such that, per 100 parts by weight of component (a), component (b) is 0.1 to 15 parts by weight, component (c) is 1 to parts by weight, and component (d) is 1 to 30 parts by weight.

2. The resin composition of claim 1 wherein component (b) is a co-oligomer having a number average molecular weight of 1,000 to 3,000.

3. The resin composition of claim 1 wherein component (c) is an elastomeric A-B-A block copolymer wherein before hydrogenation, A is a polystyrene block and B is a polybutadiene or polyisoprene block.

4. The resin composition of claim 1 wherein component (d) is an elastomeric A-B block copolymer wherein before hydrogenation, A is a polystyrene block and B is a polybutadiene or polyisoprene block.

5. The resin composition of claim 1 wherein the amount of component (b) is 0.5 to 10 parts by weight per 100 parts by weight of component (a).

6. The resin composition of claim 1 wherein the amount of component (c) is 5 to 20 parts by weight per 100 parts by weight of component (a).

7. The resin composition of claim 1 wherein the amount of component (d) is 5 to 20 parts by weight per 100 parts by weight of component (a).

* * * * *

UNITED STATES PATENT AND TRADEMARK OFFICE
CERTIFICATE OF CORRECTION

PATENT NO. : 5,418,291
DATED : May 23, 1995
INVENTOR(S) : Hideo UNO et al.

It is certified that error appears in the above-indentified patent and that said Letters Patent is hereby corrected as shown below:

Cover page, after "[21] Appl. No.:", change "182,636" to --182,536--.

Column 2, line 30, change "y" to --n--.

Column 10, line 10, change "1 to" to --1 to 30--.

Signed and Sealed this

Tenth Day of September, 1996

BRUCE LEHMAN

*Attest:*

*Attesting Officer*      *Commissioner of Patents and Trademarks*